United States Patent
Poisner

(10) Patent No.: US 8,707,086 B2
(45) Date of Patent: Apr. 22, 2014

(54) SYSTEM RECOVERY USING EXTERNAL COMMUNICATION DEVICE

(75) Inventor: David I. Poisner, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 13/091,912

(22) Filed: Apr. 21, 2011

(65) Prior Publication Data

US 2012/0272090 A1    Oct. 25, 2012

(51) Int. Cl.
*G06F 11/00* (2006.01)

(52) U.S. Cl.
USPC .............. 714/4.3; 714/4.4; 714/6.31; 714/48; 714/57

(58) Field of Classification Search
USPC ................................ 714/4.3, 4.4, 6.31, 48, 57
See application file for complete search history.

(56) References Cited

U.S. PATENT DOCUMENTS

| | | | | |
|---|---|---|---|---|
| 5,675,724 A * | 10/1997 | Beal et al. | ...................... | 714/4.3 |
| 5,748,880 A * | 5/1998 | Ito et al. | .......................... | 714/46 |
| 6,516,427 B1 * | 2/2003 | Keyes et al. | .................... | 714/25 |
| 6,826,512 B2 * | 11/2004 | Dara-Abrams et al. | ...... | 702/183 |
| 6,826,707 B1 * | 11/2004 | Stevens | .............................. | 714/2 |
| 6,895,532 B2 * | 5/2005 | Raynham | ........................ | 714/46 |
| 7,251,750 B2 * | 7/2007 | Oshima | ........................... | 714/25 |
| 7,310,744 B2 * | 12/2007 | Maity et al. | ................... | 714/6.31 |
| 7,334,166 B1 * | 2/2008 | Rhea et al. | ....................... | 714/46 |
| 7,401,003 B2 * | 7/2008 | Kim | .............................. | 702/183 |
| 7,409,575 B2 | 8/2008 | Komarla et al. | | |
| 7,620,848 B1 * | 11/2009 | Tanner | ............................. | 714/25 |
| 7,681,080 B2 * | 3/2010 | Abali et al. | ..................... | 714/27 |
| 8,107,945 B2 * | 1/2012 | Hoffner et al. | ................ | 455/419 |
| 8,352,802 B2 * | 1/2013 | Katz et al. | ....................... | 714/46 |
| 8,386,842 B2 * | 2/2013 | Lin | .............................. | 714/6.31 |
| 2002/0165952 A1 * | 11/2002 | Sewell et al. | .................. | 709/224 |
| 2002/0166084 A1 * | 11/2002 | Raynham | ........................ | 714/37 |
| 2006/0224794 A1 | 10/2006 | Stevens | | |
| 2007/0245174 A1 * | 10/2007 | Gale et al. | ....................... | 714/57 |
| 2009/0049343 A1 * | 2/2009 | Katz et al. | ....................... | 714/46 |
| 2010/0042867 A1 * | 2/2010 | Guven et al. | ...................... | 714/2 |
| 2010/0115576 A1 | 5/2010 | Hale et al. | | |
| 2010/0248707 A1 | 9/2010 | Hoffner et al. | | |

OTHER PUBLICATIONS

International Search Report and Written Opinion received for PCT Application No. PCT/US2011/063470, mailed May 4, 2012, 9 pages.
International Preliminary Report on Patentability received for Patent Application No. PCT/US2011/063470, mailed on Oct. 31, 2013, 6 pages.

* cited by examiner

*Primary Examiner* — Joshua P Lottich
(74) *Attorney, Agent, or Firm* — Jordan IP Law, LLC

(57) ABSTRACT

A method for computer system recovery is presented. In one embodiment, the method includes establishing a connection, via an interface, to a computer system to support the system recovery of the computer system. The method includes executing an emulation application as a recovery agent. The method includes retrieving, based on identifiers associated with the computer system, remote data via another interface. The method further includes performing the system recovery by using at least a part of the remote data.

17 Claims, 4 Drawing Sheets

SYSTEM RECOVERY USING EXTERNAL COMMUNICATION DEVICE

FIELD OF THE INVENTION

Embodiments of the invention relate to computing systems; more particularly, embodiments of the invention pertain to recovery of computing systems.

BACKGROUND OF THE INVENTION

The failure of a computer system (e.g., a desktop computer, a laptop) may be recovered by restoring the operating system or a part of the BIOS (Basic Input/Output System) which is corrupted. If the corruption is at the operating system level, the recovery may be performed from a backup partition on the hard disk. For example, the BIOS boots from an alternative partition and restores the main boot partition.

In some severe cases where the entire hard disk or a part of the BIOS has been corrupted (and thus the hard disk is not accessible), recovery may be done using an external storage device, such as, for example, a CD-ROM or a Flash drive. Users must have physical possession of the storage device. The situation may be more difficult if a user is traveling or if the storage device has been misplaced. In additional, system recovery professionals may have to support a wide variety of systems. It is very inconvenient for them to carry a lot of storage drives to cater for different computer systems.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
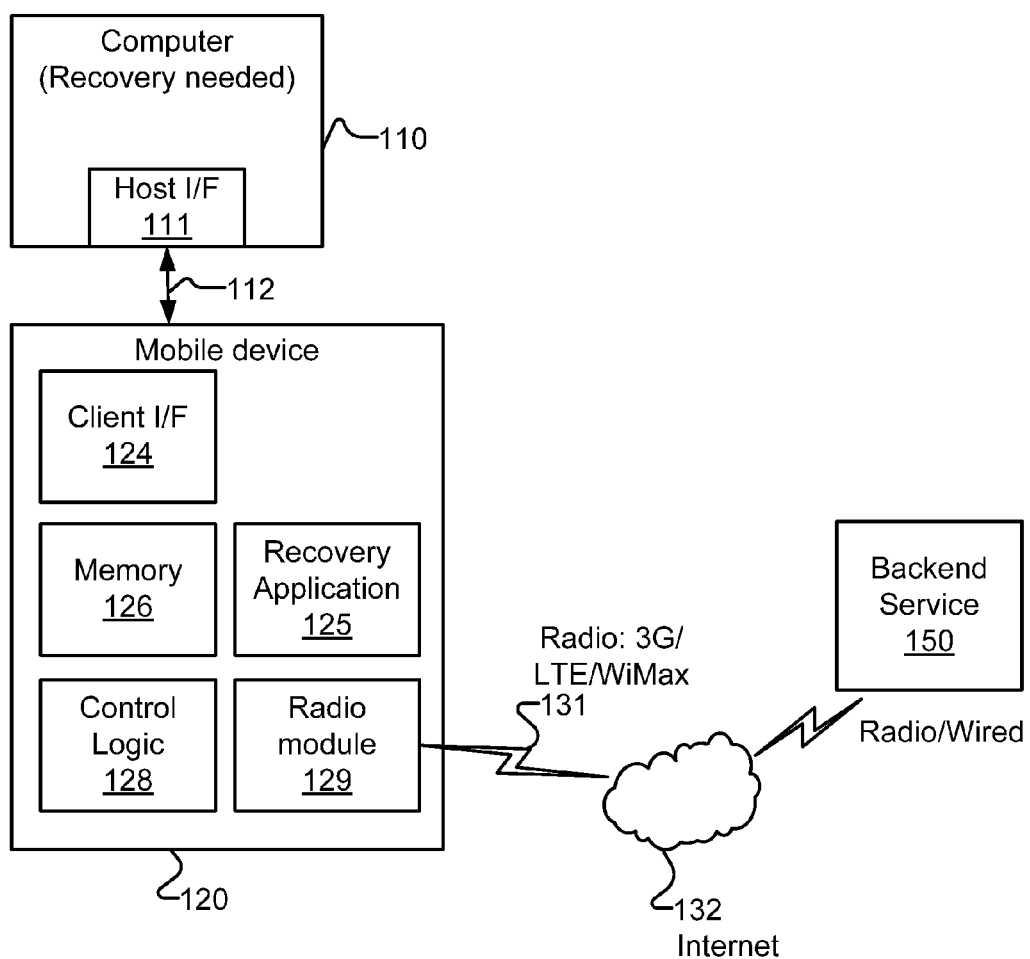
FIG. 1 is a block diagram of system recovery using a radio communication device in accordance with one embodiment of the invention.

A method for computer system recovery is presented. In one embodiment, the method includes establishing a connection, via an interface, to a computer system to support the system recovery of the computer system. The method includes executing an emulation application as a recovery agent. The method includes retrieving, based on identifiers associated with the computer system, remote data via another interface. The method further includes performing the system recovery by using at least a part of the remote data.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

The methods and apparatuses described herein are for system recovery of a computer system. Specifically, the system recovery is primarily discussed in reference to a computer system. However, the methods and apparatuses are not so limited, as they may be implemented on or in association with any integrated circuit device or system, such as cell phones, personal digital assistants, embedded controllers, mobile platforms, desktop platforms, and server platforms, as well as in conjunction with other resources.

Overview

A method for computer system recovery is presented. In one embodiment, the method includes establishing a connection, via an interface, to a computer system to support the system recovery of the computer system. The method includes executing an emulation application as a recovery agent. The method includes retrieving, based on identifiers associated with the computer system, remote data via another interface. The method further includes performing the system recovery by using at least a part of the remote data.

FIG. 1 is a block diagram of system recovery using a radio communication device in accordance with one embodiment of the invention. Many related components such as buses and peripherals have not been shown to avoid obscuring the invention. Referring to FIG. 1, the system comprises computer 110, mobile device 120, internet 132, and backend service 150.

In one embodiment, the aforementioned units are shown as discrete components. Other embodiments are possible where some or all of units are integrated within a device or within other components. In other embodiments, the aforementioned units are distributed throughout a system in hardware, software, or some combination thereof.

In one embodiment, computer 110 is a computing system that requires recovery. Computer 110 is able to communicate via host interface 111 and bus 112. In one embodiment, host interface 111 is a USB host interface. In other embodiment, host interface 111 is a serial interface/parallel interface.

In one embodiment, mobile device 120 is also referred to herein as a mobile communication device (e.g., a smart phone, a mobile phone, a tablet, or a radio communication device). In one embodiment, mobile device 120 includes client interface 124, memory 126, recovery application 125, control logic 128, and radio module 129. In one embodiment, control logic 128 is operable to execute recovery application 125. Control logic 128 also manages client interface 124, radio module 129, and memory 126 to perform different functions.

In one embodiment, mobile device 120 communicates with backend service 150 via internet 132. Mobile device 120 is connected to internet 132 via an interface supported by radio module 129. In one embodiment, the interface supports one or more radio access technologies (RATs). The radio access technologies (RATs) include, for examples, WiFi (IEEE 802.11a/b/g/n), 3G broadband, 4G broadband wireless radio, LTE (e.g., 3GPP release 10), and WiMAX (e.g., IEEE std. 802.16e-2005).

In one embodiment, mobile device 120 emulates a bootable storage device (e.g., a USB boot mass storage device). In one embodiment, mobile device 120 is plugged into interface 111 (e.g., a USB port) of computer 110. In one embodiment, client interface 124 communicates with host interface 111.

In one embodiment, a user initiates a "computer recovery" mode on mobile device 120. A user turns on an application which is stored on memory 126. Control logic 128 loads and executes the application. The application (e.g., recovery application 125) makes mobile device 120 perform as a USB bootable storage device to computer system 110. Control logic 128, when executing recovery application 125, performs an emulation such that mobile device 120 turns into a storage device (e.g., USB bootable mass storage device) to computer 110.

In one embodiment, after computer 110 is booted, computer 110 uses mobile device 120 as a boot device.

In one embodiment, recovery application 125 requires a user to enter details, such as, for example, the model number and the serial number of computer 110. In one embodiment, computer 110 provides the model number and the serial number to recovery application 125.

In one embodiment, control logic 128, in conjunction with recovery application 125, obtains specific data used for system recovery of computer 110 via another communication interface (i.e., an internet access connection). The internet connection is supported via a radio access technology. In one embodiment, the specific data is referred to herein as recovery data. The recovery data is stored on a remote server providing backend service 150. In one embodiment, the remote server is managed or hosted by manufacturers, retailers, IT repair service companies. In one embodiment, the remote server is connected to the internet such that mobile device 120 is able to retrieve the recovery data via the internet. In one embodiment, backend service 150 includes one or more intermediary servers and one or more storage servers that store recovery data. An intermediary server provides authentication service and if the authentication is valid, the intermediary server communicates with a storage server to retrieve recovery data. In one embodiment, a storage server is managed by manufacturers or retailers. The storage server responds to request from an intermediary server and does not serve requests from public users directly.

In one embodiment, for security purposes, recovery application 125 requires a user to enter a password (e.g., user authentication process, biometric identification, etc.) prior to performing a system recovery.

In one embodiment, recovery data retrieved from the internet are sent to computer 110 by mobile device 120. In one embodiment, recovery data are buffered by mobile device 120 on memory 126. For example, the recovery data are erased after the system recovery is completed. In one embodiment, recovery data are unique to computer 110. Different recovery data have to be retrieved to perform system recovery for another computer. In one embodiment, mobile device 120 is capable of storing two or more different recovery data (recovery images) either on memory 126 or other memory/disk space. The recovery images are removed by users or by system (e.g., after expiry dates).

In one embodiment, computer 110, in response to recovery data, performs diagnostics and makes necessary repairs, such as, for example, writing the system BIOS firmware, re-writing system image (operating system image) on the hard disk. In one embodiment, a BIOS firmware includes firmware modules and is a part of a unified extensible firmware interface (UEFI).

In one embodiment, mobile device 120 emulates an arbitrarily large storage device, as mobile device 120 is capable of downloading more data via the radio wireless communications links. Recovery application 125 is able to receive the status from computer 110, such as, for example, the progress of the system recovery. A user is able to find out whether the system recovery is a success or a failure. In one embodiment, recovery application 125 monitors individual stages of the recovery. For example, after the BIOS firmware/system image of computer 110 is repaired, the recovered system reports to recovery application 125 about the completion. In one embodiment, recovery application 125 determines the recovery progress based on the progress of recovery data retrieval.

In one embodiment, system recovery in accordance with FIG. 1 avoids the need to use a dedicated physical storage device. A user does not need physical possession of the recovery media. A communications device, such as, for example, a smart phone, is operable to support the system recovery. In other words, the physical storage device is virtualized through an intermediate device, such as, for example, a smart phone.

It will be appreciated by those skilled in the art that other RAT systems may be used while maintaining approximately the same characteristic. For example, in one embodiment, a mobile station, a UE, a receiver (in the downlink scenario) communicates with a base station. In this downlink case, a mobile station is a receiver. A receiver may be interchangeably referred to as an advanced mobile station (AMS), a mobile station (MS), a subscriber station (SS), a user equipment (UE), or a station (STA) at the system level herein. A reference to MS herein may also be seen as a reference to either of AMS, SS, UE, or STA.

Figure 2:
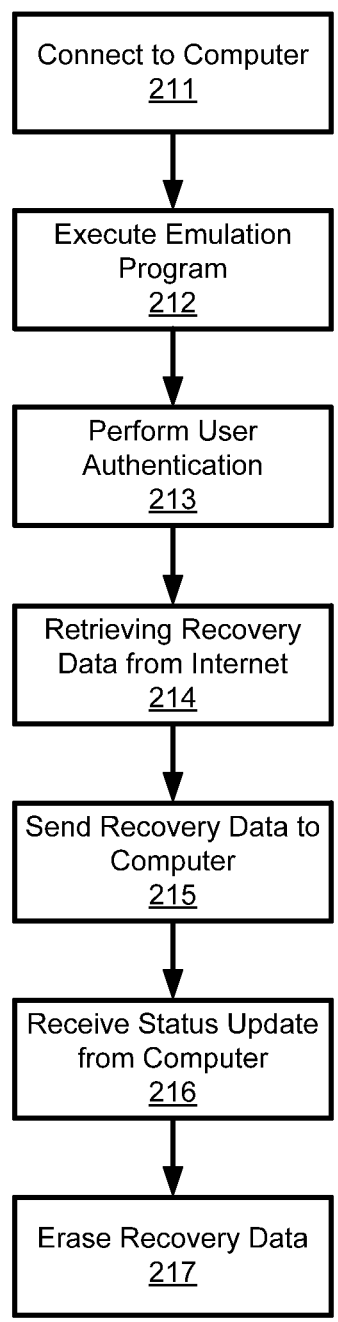
FIG. 2 is a flow diagram of one embodiment of a process to support system recovery using a radio communication device.

FIG. 2 is a flow diagram of one embodiment of a process to support system recovery using a radio communication device. The process is performed by processing logic that may comprise hardware (circuitry, dedicated logic, etc.), software (such as one that is run on a general purpose computer system or a dedicated machine), or a combination of both. In one embodiment, the process is performed in conjunction with a network apparatus (e.g., mobile device 120 with respect to FIG. 1). In one embodiment, the process is performed by a computer system such as the computer system shown in FIG. 4.

Referring to FIG. 2, in one embodiment, processing logic begins by connecting to a computer system via a wired interface (e.g., USB) to support system recovery of the computer system (process block 211). Processing logic establishes a connection to a computer system to support system recovery of the computer system. Processing logic is connected to the computer system via a high speed interconnect.

In one embodiment, processing logic executes a recovery program which enables the emulation as a bootable storage device to the computer system (process block 212). Processing logic executes an emulation application as a recovery agent. The computer system communicates with the recovery agent as if the recovery agent is a bootable storage device connected.

In one embodiment, processing logic performs a user authentication process before continuing with a system recovery process (process block 213). Additionally, processing logic receives identifiers from a user or from the computer system. The identifiers (e.g., a serial number, a model number, a manufacturer number, etc.) are unique to the computer system and are useful to identify the recovery date to be retrieved from the internet.

In one embodiment, processing logic monitors the reliability of the connection to the computer system, the connection to the internet, or both. Processing logic determines to continue with the system recovery if the connections are reliable.

In one embodiment, processing logic retrieves recovery data unique to the computer system (process block 214). The recovery data are not present in the memory of processing logic before the processing logic is connected to the computing system. The recovery data are not permanently stored by processing logic and will be erased after the system recovery is complete. The recovery data are retrieved based on the identifiers associated with the computer system.

In one embodiment, processing logic sends the recovery data to the computer system (process block 215). The computer system performs a system recovery by using at least a part of the recovery data. The recovery process includes, such as, for example, diagnostic procedures, writing a system image on the hard disk, writing to a firmware image, or any combinations thereof.

In one embodiment, processing logic receives status updates from the computer system (process block 216). Processing logic monitors or receives a status from the computer system. For example, the status indicates the progress of the system recovery.

In one embodiment, processing logic erases recovery data after the system recovery is completed (process block 217). Processing logic retrieves different remote data from the internet to perform system recovery for a different computing system. The recovery data are not present in the memory of processing logic before the processing logic is connected to the computing system.

Figure 3:
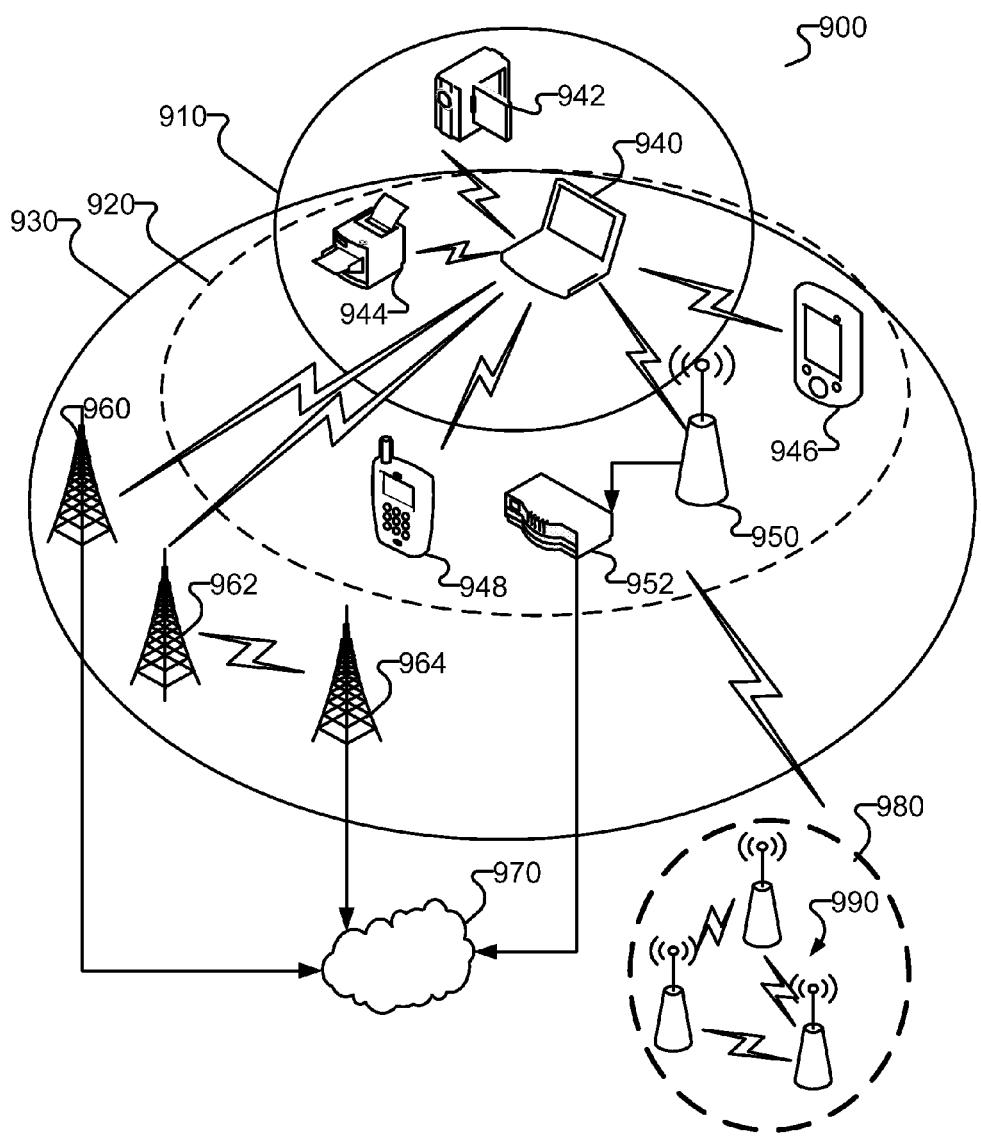
FIG. 3 is a diagram representation of a wireless communication system in accordance with one embodiment of the invention.

FIG. 3 is a diagram representation of a wireless communication system in accordance with one embodiment of the invention. Referring to FIG. 3, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread spectrum modulation (e.g., direct sequence code division multiple access (DS-CDMA), frequency hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct sequence spread spectrum (DSSS) modulation, frequency hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s). For example, laptop computer 940 operates in accordance with LTE, advanced LTE, 3GPP2, 4G or related versions thereof.

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 3 depicts a WPAN, a WLAN, and a WMAN, In one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 4:
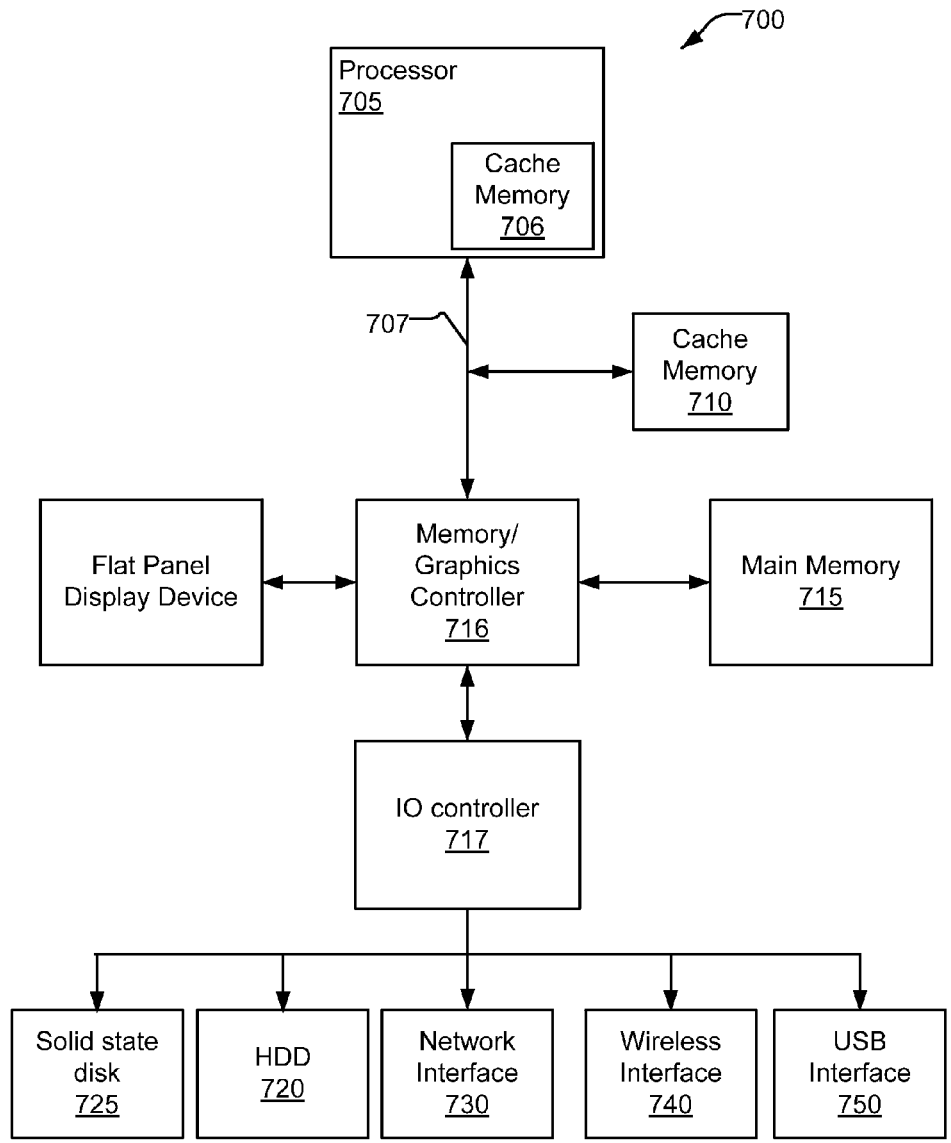
FIG. 4 illustrates a computer system for use with one embodiment of the present invention.

FIG. 4 illustrates an example of a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. In one embodiment, IO controller 717 is coupled to universal serial bus (USB) interface 750 or other I/O interfaces for communication to other devices. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 4. Furthermore, other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
    establishing, via a first interface, a connection to a first system to support system recovery of the first system;
    executing an emulation application as a recovery agent;
    retrieving, based on one or more identifiers associated with the first system, first remote data via a second interface different from the first interface;
    performing the system recovery by using at least a part of the first remote data; and
    monitoring the reliability of the first interface prior to the system recovery.

2. The method of claim 1, wherein the first system communicates with the recovery agent as if the recovery agent is a bootable storage device connected to the first system via the first interface.

3. The method of claim 1, wherein prior to the connection to the first system, the first remote data are not present in a memory which stores the emulation application.

4. The method of claim 1, wherein the first remote data are from the internet via the second interface, wherein the first remote data are not permanently stored and will be erased after the system recovery is complete.

5. The method of claim 1, further comprising:
    erasing the first remote data; and
    retrieving second remote data from the internet to perform system recovery for a second system which is a different system from the first system, wherein the first remote data and the second remote data are stored temporarily and will be removed after usages.

6. The method of claim 1, further comprising requesting a password for authentication prior to the system recovery.

7. The method of claim 1, further comprising receiving the one or more identifiers from the first system via the first interface or from a user, wherein the one or more identifiers include a model number and a serial number unique to the first system.

8. The method of claim 1, further comprising receiving a status, from the first system, which indicates the progress of the system recovery.

9. The method of claim 1, wherein the first interface is a wired connection, wherein the second interface is a wireless connection in conjunction with a radio access technology.

10. The method of claim 1, wherein the system recovery comprises a diagnostic process of the first system.

11. The method of claim 1, wherein the system recovery comprises writing a system image of the first system to recover the first system to an operational state.

12. A method comprising:
    connecting, via a first interface, to a first device acting as a bootable storage device storing recovery data, wherein the recovery data are not stored on the first device initially at the time of the connection;
    providing one or more identifiers to the first device, wherein the first device is operable to retrieve the recovery data from a remote server via an internet connection using a radio access technology;
    receiving the recovery data from the first device via the first interface; and
    performing system recovery based at least on the recovery data.

13. The method of claim 12, further comprising requesting user authentication prior to the system recovery.

14. The method of claim 12, wherein the system recovery comprises performing a diagnostic process, erasing a system image on a non-volatile memory, or writing the system image.

15. A radio wireless communication apparatus comprising:
    a first interface;
    a radio module to support a second interface to communicate with a network in accordance with a radio access technology;
    a control logic unit operable to connect, via a first interface, to a computing system to support system recovery for the computing system; and
    memory coupled to the control logic unit,
    wherein the control logic unit is operable to retrieve first remote data from the internet via the second interface, wherein the first remote data are stored temporarily on the memory.

16. The apparatus of claim 15, wherein the apparatus is operable to emulate as a bootable storage device to the computing system and to retrieve, via the second interface, first remote data for the system recovery.

17. The apparatus of claim 15, wherein the control logic unit is operable to
    erase first remote data used for the computing system; and retrieve second remote data from the internet for a second computing system, wherein the second remote data are not present in the memory prior to the first interface connected to the second computing system.

* * * * *